United States Patent
Rodriguez Bravo

(10) Patent No.: US 10,955,894 B2
(45) Date of Patent: Mar. 23, 2021

(54) CENTRALIZED POWER MANAGEMENT OF WIRELESS DEVICES

(71) Applicant: INTERNATIONAL BUSINESS MACHINES CORPORATION, Armonk, NY (US)

(72) Inventor: Cesar Augusto Rodriguez Bravo, Alajuela (CR)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 240 days.

(21) Appl. No.: 16/053,045

(22) Filed: Aug. 2, 2018

(65) Prior Publication Data
US 2020/0042070 A1 Feb. 6, 2020

(51) Int. Cl.
| G06F 1/3212 | (2019.01) |
| G06F 1/3234 | (2019.01) |
| G06F 1/3209 | (2019.01) |
| G06F 1/3206 | (2019.01) |

(52) U.S. Cl.
CPC .......... *G06F 1/3212* (2013.01); *G06F 1/3209* (2013.01); *G06F 1/3234* (2013.01); *G06F 1/3206* (2013.01)

(58) Field of Classification Search
CPC .... G06F 1/3206; G06F 1/3212; G06F 1/3209; G06F 1/3234
USPC .................................................. 713/300, 340
See application file for complete search history.

(56) References Cited

U.S. PATENT DOCUMENTS

| 4,660,027 A | 4/1987 | Davis |
| 6,717,520 B1 | 4/2004 | Dorenbosch |
| 2005/0017685 A1 | 1/2005 | Rees et al. |
| 2005/0027466 A1 | 2/2005 | Steinmetz et al. |

(Continued)

FOREIGN PATENT DOCUMENTS

WO 2016148474 9/2016

OTHER PUBLICATIONS

Cawley, "Windows Mobile Battery Monitors and Tools: A List of Helpful Applications", http://www.brighthub.com/mobile/windows-mobile-platform/articles/38239.aspx, Great Battery Management Tools for Windows Mobile, Jul. 4, 2011, 2 pages.

(Continued)

*Primary Examiner* — Ji H Bae
(74) *Attorney, Agent, or Firm* — William Hartwell; Andrew D. Wright; Roberts Calderon Safran & Cole, P.C.

(57) ABSTRACT

Systems and methods for centralized power management of wireless user devices are disclosed. In embodiments, a method comprises: monitoring, by a computing device, battery charge levels for remote user devices; identifying, by the computing device, that a battery charge level of a first user device of the remote user devices is below a predetermined threshold value based on the monitoring; identifying, by the computing device, at least one in-use device from the remote user devices based on real-time data indicating that the at least one in-use device is in use by a user; and sending, by the computing device, an alert to the at least one in-use device based on the identifying the at least one in-use device, wherein the alert includes information about the first user device and information regarding the battery charge level of the first device.

22 Claims, 6 Drawing Sheets

(56) References Cited

U.S. PATENT DOCUMENTS

| | | | | |
|---|---|---|---|---|
| 2007/0124608 | A1* | 5/2007 | Knowlson | G06F 1/325 |
| | | | | 713/300 |
| 2012/0065802 | A1 | 3/2012 | Seeber et al. | |
| 2016/0073351 | A1 | 3/2016 | Cardozo et al. | |
| 2017/0208566 | A1 | 7/2017 | Yeung et al. | |
| 2017/0213452 | A1 | 7/2017 | Brunolli | |
| 2017/0288447 | A1 | 10/2017 | Guibene et al. | |
| 2018/0167342 | A1* | 6/2018 | Lewis | H04L 51/24 |
| 2018/0330404 | A1* | 11/2018 | Bennett | G06Q 30/0261 |
| 2018/0332159 | A1* | 11/2018 | Yu | H04M 1/72527 |

OTHER PUBLICATIONS

Anonymous, "Power Management", http://www.ti.com/power-management/battery-management/overview.html, Texas Instruments, accessed Jun. 19, 2018, 5 pages.

Anonymous, "Power Management", http://www.linear.com/products/power_management, Analog Devices, accessed Jun. 19, 2018, 11 pages.

Mangum, "Battery Power Online", http://www.batterypoweronline.com/articles/top-four-considerations-for-battery-management-in-a-connected-world/, Battery Power, accessed Jun. 19, 2018, 6 pages.

Sekine, "Energy-harvesting devices replace batteries in IoT sensors", https://www.scribd.com/document/358326250/Energy-harvesting-Devices-Replace-Batteries-in-IoT-Sensors-Core-Code, Scribd.com, accessed Jun. 19, 2018, 7 pages.

Rowe, "IoT battery outlook: Types of batteries for IoT devices", http://internetofthingsagenda.techtarget.com/feature/IoT-battery-outlook-Types-of-batteries-for-IoT-devices, IoT Agenda, Apr. 2016, 5 pages.

Anonymous, "TI introduces the industry's smallest and lowest power battery management solution for wearables and IoT products", http://newscenter.ti.com/2015-10-01-TI-introduces-the-industrys-smallest-and-lowest-power-battery-~management-solution-for-wearables-and-IoT-products, Texas Instruments, Oct. 1, 2015, 3 pages.

Anonymous, "Calculating Battery Life in IoT Applications", http://uk.farnell.com/calculating-battery-life-in-iot-applications#calculator, Farnell, Mar. 4, 2017, 7 pages.

Circuit Cellar Staff, "Small, Low-Power Battery Management Solution for the IoT", http://circuitcellar.com/cc-blog/small-low-power-battery-management-solution-for-the-iot/, Circuit Cellar, Oct. 6, 2015, 1 page.

Mackenzie, "Internet of Things device battery life optimization: Engineering design considerations", http://www.embedded-computing.com/embedded-computing-design/internet-of-things-device-battery-life-optimization-engineering-design-considerations, Embedded Computing Design, Mar. 1, 2014, 3 pages.

Kaur et al, "A study of power management techniques for Internet of Things (IoT)", http://ieeexplore.ieee.org/document/7754992/, 2016 International Conference on Electrical, Electronics, and Optimization Techniques (ICEEOT), Mar. 3-5, 2016, 2 pages.

\* cited by examiner

CENTRALIZED POWER MANAGEMENT OF WIRELESS DEVICES

BACKGROUND

The present invention relates generally to battery management and, more particularly, to centralized power management of a plurality of wireless devices.

The use of battery powered mobile user devices, including Internet of Things (IOTs) devices, is on the rise. The battery life of a user device and a user's ability to monitor the battery life are important considerations to consumers. Presently, individual user devices may include dedicated software that monitors the battery life and enables users to view the battery charge level for the device. Additionally, secondary user devices (e.g., accessories such as headphones, smartwatches, etc.) may come with dedicated software that can be loaded into a smartphone or the like to enable a user to monitor the accessory from the smartphone.

Disadvantages of such systems include the need for operating system (OS) dependent battery monitoring software (i.e., apps are tailor made for specific OS), which may result in inoperability of battery monitoring software with user devices. Further such systems typically utilize smartphone-specific battery monitoring apps, which are not accessible if the smartphone is off or otherwise unavailable to a user. Further, such systems enable only a single point of contact for a user. For example, a smartphone becomes the only point of contact for obtaining battery updates for other user devices. Moreover, such battery monitoring systems may be based on passive monitoring that enables alerts only and does not allow a user to remotely change battery settings to increase battery life of a user device. Additionally, battery management applications for smartphones are typically device-specific, such that a user having a plurality of user devices of different makes/models may need to load multiple battery management applications onto their smartphone in order to obtain battery charge status updates for all of the devices, which is inconvenient to a user and eats up smartphone resources. Moreover, user device batteries may lose power even while the device is off, and the last battery alert from typical battery management software may not accurately reflect the current state of the device's battery charge.

SUMMARY

In an aspect of the invention, a method includes: monitoring, by a computing device, battery charge levels for remote user devices; identifying, by the computing device, that a battery charge level of a first user device of the remote user devices is below a predetermined threshold value based on the monitoring; identifying, by the computing device, at least one in-use device from the remote user devices based on real-time data indicating that the at least one in-use device is in use by a user; and sending, by the computing device, an alert to the at least one in-use device based on the identifying the at least one in-use device, where the alert includes information about the first user device and information regarding the battery charge level of the first device. Advantageously, methods of the invention enable monitoring alerts to be dispersed to devices currently in use by the user, rather than sending alerts to only one predetermined user device.

In embodiments, the method further includes determining, by the computing device, whether each of the remote user devices includes battery management software. In embodiments, the computing device determines that one or more of the remote user devices does not include the battery management software, and the method further comprises: generating, by the computing device, battery charging data for each of the one or more remote user devices by testing batteries of each of the one or more remote user devices; monitoring, by the computing device, changes in the battery charging data over time; and sending, by the computing device, a notification regarding battery performance to the at least one in-use device based on the monitoring. Thus, methods of the invention advantageously enable battery performance monitoring in user devices without their own dedicated battery management software.

In an aspect of the invention, a method includes: determining, by a computing device, that a remote user device is in an off-line state where battery status data of the remote user device is unavailable to the computing device; initiating, by the computing device, a change in the remote user device from the off-line state to an on-line state where the battery status data is available to the computing device, where the initiating is based on a predetermined wake-up schedule defining a time period between scheduled wake-up sessions; receiving from the remote user device, by the computing device, battery status data of the remote user device; and sending, by the computing device, instructions to the remote user device to revert to the off-line state from the on-line state; determining, by the computing device, a change in battery status by comparing the battery status data to historic battery status data; and determining, by the computing device, whether the predetermined wake-up schedule is to be adjusted based on the change in battery status. Thus, embodiments of the invention enable adjustment of wake-up schedules for improved battery monitoring of user devices.

In aspects, the computing device determines that the change in battery status is less than a predetermined threshold value and adjusts the wake-up schedule by increasing the time period between scheduled wake-up sessions. In aspects, the computing device determines that the change in battery status is greater than a predetermined threshold value and adjusts the wake-up schedule by decreasing the time period between scheduled wake-up sessions. Thus, aspects of the invention enable wake-up sessions to be moved farther apart such that unnecessary draining of the user device battery due to monitoring activity may be avoided. Conversely, aspects of the invention enable wake-up sessions to be moved closer together to adjust for deteriorating battery performance (e.g., ability to hold a charge), over time.

In another aspect of the invention, there is a computer program product comprising a computer readable storage medium having program instructions embodied therewith. The program instructions are executable by a computing device to cause the computing device to: monitor battery charge levels for remote user devices; identify that a first user device of the remote user devices is a lower battery device when a battery charge level of the first user device is below a predetermined threshold value based on the monitoring; identify at least one in-use device from the remote user devices based on real-time data indicating that the at least one in-use device is in use by a user; and send an alert to the at least one in-use device including information about the battery charge level of the low battery device. Advantageously, computer program products of the invention enable monitoring alerts to be dispersed to devices currently in use by the user based on real-time data, rather than sending alerts to only one predetermined user device.

In embodiments, the computer program product includes program instructions to further cause the computing device to determine whether each of the remote user devices includes battery management software. In aspects, the computer program product determines that one or more of the remote user devices does not include the battery management software, and the program instructions further cause the computing device to: generate baseline battery charging data for each of the one or more remote user devices by testing batteries of each of the one or more remote user devices; monitor changes in the baseline battery charging data over time; and send a notification to the at least one in-use device based on the monitoring. Thus, computer program products of the invention enable battery performance monitoring in user devices without their own dedicated battery management software.

In another aspect of the invention, there is a system comprising: a processor, a computer readable memory and a computer readable storage medium associated with a computing device; program instructions to monitor battery charge levels for remote user devices; program instructions to identify that a battery charge level of a first user device of the remote user devices is below a predetermined threshold value based on the monitoring; program instructions to identify at least one in-use device from the remote user devices based on real-time data indicating that the at least one in-use device is in use by a user; and program instructions to send an alert to the at least one in-use device based on the identifying the at least one in-use device, where the alert includes information about the first user device and information regarding the battery charge level of the first device, where the program instructions are stored on the computer readable storage medium for execution by the processor via the computer readable memory. Thus, systems of the invention enable monitoring alerts to be dispersed to devices currently in use by the user, rather than sending alerts to only one predetermined user device.

In embodiments, the system includes program instructions to send user selectable battery management options to the at least one in-use device; program instructions to receive a selection of one of the user selectable battery management options; and program instructions to send instructions to the first user device to implement a battery management function based on the selection. Thus, embodiments of the invention advantageously enable remote battery management of user devices from a central location.

In another aspect of the invention, there is a system comprising: a processor, a computer readable memory and a computer readable storage medium associated with a computing device; program instructions to determine that a remote user device is in an off-line state where battery status data of the remote user device is unavailable to the computing device; program instructions to initiate a change in the remote user device from the off-line state to an on-line state where the battery status data is available to the computing device, where the initiating is based on a predetermined wake-up schedule defining a time period between scheduled wake-up sessions; program instructions to receive from the remote user device, battery status data of the remote user device; and program instructions to send instructions to the remote user device to revert to the off-line state from the on-line state; program instructions to determine a change in battery status by comparing the battery status data to historic battery status data; and program instructions to adjust the predetermined wake-up schedule based on the determined change in battery status, where when the change in battery status is less than a predetermined threshold value the time period between wake-up sessions is increased and when the change in battery status is more than the predetermined threshold value the time period between wake-up sessions is decreased. Thus, systems of the invention enable adjustment of wake-up schedules for improved battery monitoring of user devices.

In embodiments, the system determines that the change in battery status is less than 10% and adjusts the predetermined wake-up schedule comprises increasing the time period between scheduled wake-up sessions by 20%. In embodiments, the system determines that the change in battery status is greater than 50% and adjusts the predetermined wake-up schedule comprises decreasing the time period between scheduled wake-up sessions by 20%. Thus, aspects of the invention enable wake-up sessions to be moved farther apart such that unnecessary draining of the user device battery due to monitoring activity may be avoided. Conversely, aspects of the invention enable wake-up sessions to be moved closer together to adjust for deteriorating battery performance (e.g., ability to hold a charge), over time.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
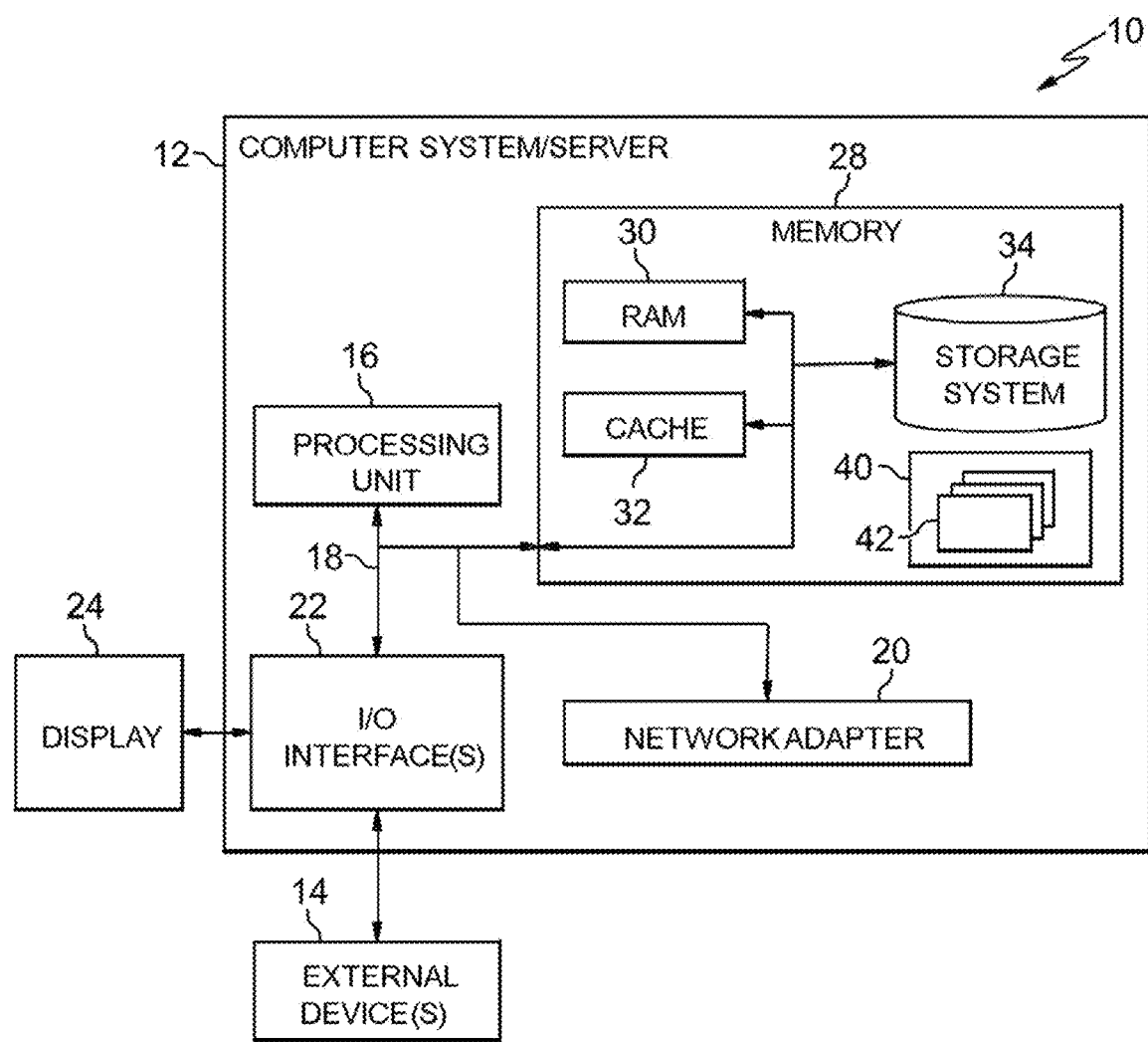
FIG. 1 depicts a computing infrastructure according to an embodiment of the present invention.

The present invention relates generally to battery management, and, more particularly, to centralized power management of a plurality of wireless devices. In embodiments, a system and method are provided that alert a user if any of a plurality of registered user devices (e.g., Internet of Things (IOT) devices, wearables, cameras, toys, etc.) reach a predetermined battery power level. Unlike typical operating system (OS) dependent battery management systems, embodiments of the invention provide an OS independent solution enabling a user to monitor the battery charge of a user device regardless of the OS associated with the user device. Moreover, solutions of the invention enable monitoring of multiple diverse user devices, and can dynamically determine which user devices to send alerts based on which devices are currently in use. Aspects of the invention further enable remote power management of user devices, such as the ability to shut down or power off a device. Moreover, embodiments of the invention eliminate the need for a user to download multiple device-specific or OS-specific battery management software applications, freeing up user device resources and enabling a user to control all of their devices from a single interface.

Additionally, in embodiments, a system and method for cognitive battery management is provided that utilizes real-time data about the current state of user device batteries to improve battery power management of the devices. In aspects, the cognitive battery management system and method incorporates the monitoring of on-line and/or off-line registered devices, enabling a user to manage the battery power of all of their registered devices, whether in use or not, to maximize their usable life. In embodiments, a system learns about behaviors/characteristics of each user device battery and creates personalized profiles that are used to monitor the battery level of each user device in a unique way. In embodiments, the cognitive battery management system and method is part of a larger battery management/alert system and method, providing battery level alerts to users.

Based on the above, it can be understood that embodiments of the invention advantageously provide technical improvements to the field of battery management and monitoring. In aspects, a system and method provide technical solutions to the technical problems associated with device-specific or OS-specific battery management software, by enabling remote monitoring of a plurality of diverse devices regardless of their make, model or OS. In this way, user devices may be improved by illuminating the need to download multiple battery management software applications onto the device, thereby saving computing resources. Moreover, embodiments of the invention provide technical solutions to the technical problems associated with single point of contact battery monitoring, by enabling smart battery alerts to only those user devices which are being utilized by a consumer. Further, embodiments of the invention provide the technical improvement of enabling remotely initiated battery management functions for various user devices from a plurality of different user devices. Thus, a user is no longer limited to a single user device (e.g., a smartphone) to manage battery life of their wireless devices. Additional technical advantages result from embodiments of the invention that enable customized monitoring and management of multiple user device, regardless of whether they are on-line and off-line.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
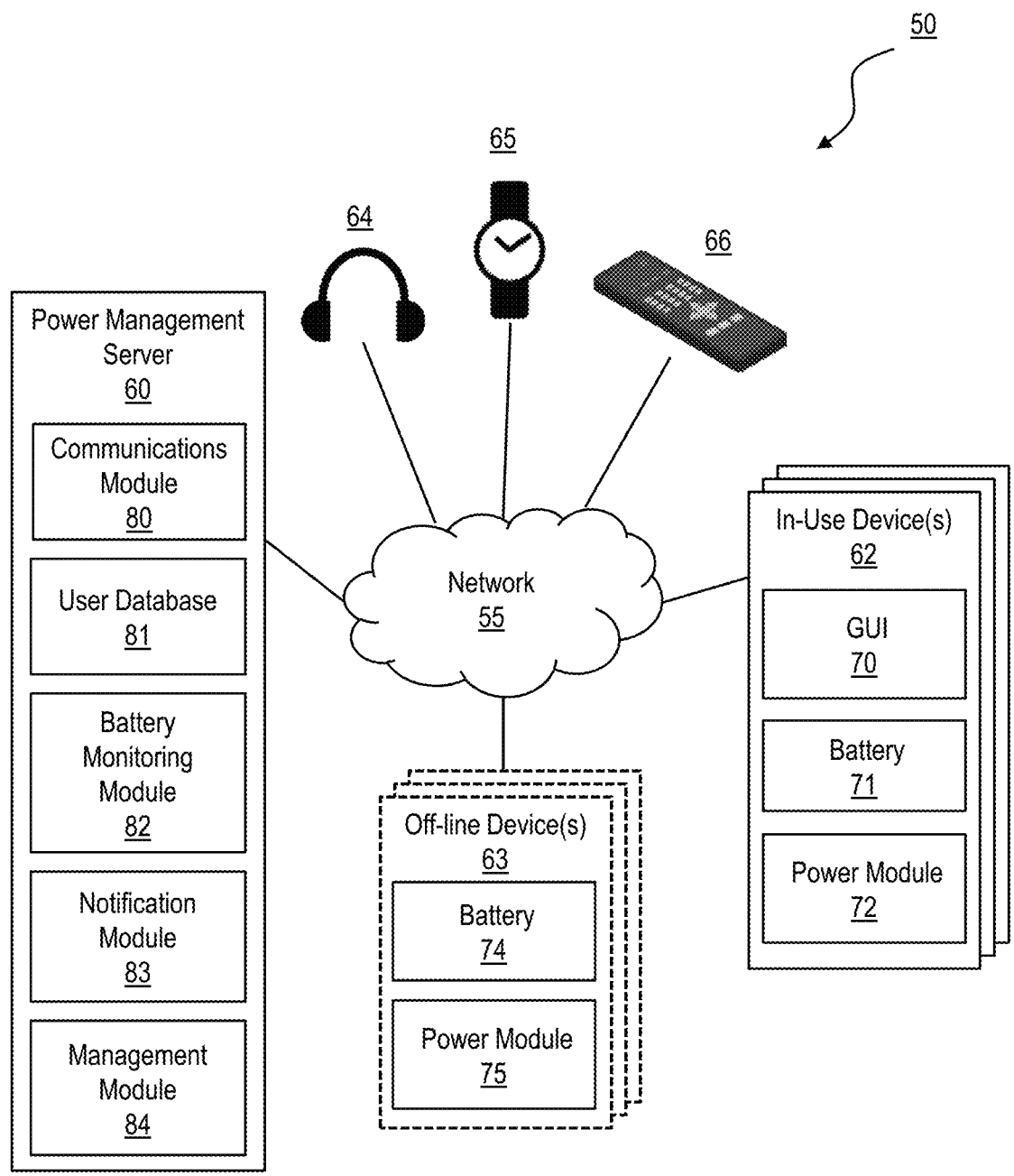
FIG. 2 shows an exemplary environment in accordance with aspects of the invention.

FIG. 2 shows an exemplary power management environment 50 in accordance with aspects of the invention. The power management environment 50 includes a network 55 connecting a power management server 60 to a plurality of wireless battery powered electronic user devices, represented in FIG. 2 by in-use device(s) 62, off-line device(s) 63, and Internet-of Things (IoT) devices 64-66. The plurality of wireless battery powered electronic user devices (hereafter user devices) of power management environment 50 may include computing devices, electronic accessories such as headphones 64 and smartwatch 65, device controls such as controller 66, IoT devices, or other battery powered electronic user devices.

In embodiments, the in-use device(s) 62 and/or the off-line device(s) 63 are in the form of the computer system 12 of FIG. 1, and is connected to the network 55 via the network adapter 20 of FIG. 1. User devices of power management environment 50 may be in the form of a smartphone, a tablet, a laptop computer, an e-reader, a smartwatch or other smart wearable device, or another battery-powered computer user device. In aspects, one or more of the user devices of FIG. 2 are configured to provide a user with alerts, such as through a graphical user interface (GUI). By way of example, the in-use device(s) 62 is shown including a GUI 70 configured to receive input from a user and present a user with information, including alerts from the power management server 60. In embodiment, the in-use device(s) 62 of FIG. 2 also includes a battery 71 and a power module 72 including battery management software. In embodiments, existing battery management software tools are utilized by in-use device(s) 62. In aspects, battery management software of power module 72 enables the in-use device(s) 62 to monitor battery performance over time as well as battery charge levels. Similarly, in embodiments, off-line-device(s) 63 includes a battery 74 and a power module 75 including battery management software (e.g., enabling monitoring of battery performance over time as well as battery charge levels). In aspects, one or more in-use devices 62 and/or off-line devices 63 are free of any internal battery management software. While not depicted, it should be understood that IoT devices 64-66 also include respective batteries, and may include internal battery management software, as well as other components not shown.

In embodiments, the network 55 is any suitable communication network or combination of networks, such as a local area network (LAN), a general wide area network (WAN), and/or a public network (e.g., the Internet). In aspects, the power management server 60 is in the form of the computer system 12 of FIG. 1, and is connected to the network 55 via the network adapter 20 of FIG. 1. In embodiments, the power management server 60 is a special purpose computing device that is part of a power management infrastructure. For example, in embodiments, the power management server 60 is a cloud-based server configured to provide power management services for remote user devices for a plurality of consumers. In another example, the power management server 60 is a local server configured to provide power management services for remote user devices on a local network 55 (e.g., a household server providing power management services for a user's wireless user devices).

Still referring to FIG. 2, in implementations, the power management server 60 includes one or more modules having one or more program modules (e.g., program module 42 of FIG. 1) configured to perform one or more of the functions described herein. In embodiments, the power management server 60 includes a communications module 80 configured to enable communication with the user devices of power management environment 50 via the network 55. In aspects, the communications module 80 is configured to obtain user information (e.g., user device registration information) from one or more users (e.g., via an in-use device 62), and save the user information in the user database 81 of the power management server 60. In embodiments, the communications module 80 saves user information on a remote user database (not shown).

In embodiments, the power management server 60 includes a battery monitoring module 82 configured to determine if registered user devices (e.g., devices 62-66 of FIG. 2) include battery management software. In aspects, the battery monitoring module 82 is further configured to test the battery of user devices which do not include their own battery management software in order to monitor battery performance, and provide alerts (e.g., failing battery alerts, etc.) to users based on the monitored battery performance. In embodiments, the battery monitoring module 82 is configured to monitor battery charge levels of registered user devices (e.g., devices 62-66 of FIG. 2), either directly or through existing battery management software on the user devices. In aspects, the battery monitoring module 82 is configured to determine when a battery charge level of a user device is below a threshold value, identify one or more user devices currently in-use by a registered user, and cause a notification module 83 to send a low battery alert to the in-use device (e.g., in-use device 62).

Still referring to FIG. 2, in embodiments, the power management server 60 includes a management module 84 in communication with the notification module 83. In aspects, the notification module 83 is configured to send selectable battery management options to the in-use device (e.g., in-use device 62) enabling a user to select a battery management option, and communicate the selected battery management option to the management module 84. In aspects, the management module 84 is configured to send battery management instructions to a low-battery user device based on the selected battery management options to cause the low-battery user device to implement the instructions and cause a change in the low-battery user device (e.g., power off the user device, put the user device in energy saving mode, etc.). In embodiments, the battery management module 84 is further configured to determine if the instructions where successfully initiated by the low-battery user device and to generate an alert based on the determination (e.g., an alert that the instructions were initiated successfully, an error alert indicating the instructions were not initiated successfully).

In embodiments, the power management server 60 is configured to provide cognitive battery management for one or more of the user devices of FIG. 2. In aspects, the battery monitoring module 82 is configured to: determine that a user device is in an off-line mode (e.g., powered off, in sleep mode, etc.); cause the user device to change to an on-line mode (e.g., powered on, in an active mode, etc.); receive battery status data from the battery system or battery management software of the user device; send instructions to the user device to revert back to the off-line mode; compare battery status data to history battery status data to determine a difference in battery status; and optionally, adjust predetermined wake-up times in a schedule based on the difference in battery status. In embodiments, battery status data obtained by the battery monitoring module 82 includes battery performance data and/or battery charge level data. In aspects, battery status data is saved locally or remotely by the power management server 60. In embodiments, the cognitive battery management functions of the power management server 60 are performed in conjunction with other battery monitoring and testing functions of the power management server 60.

In embodiments, the power management server 60 includes additional or fewer components than those shown in FIG. 2. In embodiments, separate components are integrated into a single computing component or module. Additionally, or alternatively, a single component are implemented as multiple computing components or modules. Likewise, the user devices of FIG. 2 (i.e., user devices 62-66) may include additional or fewer components than those shown in FIG. 2. In embodiments, separate components are integrated into a single computing component or module, or a single component is implemented as multiple computing components or modules for each of the user device of FIG. 2. For example, one or more user devices of FIG. 2 may or may not contain GUIs (e.g., 70) and/or power modules (e.g., power modules 72, 75) with power management software.

Figure 3:
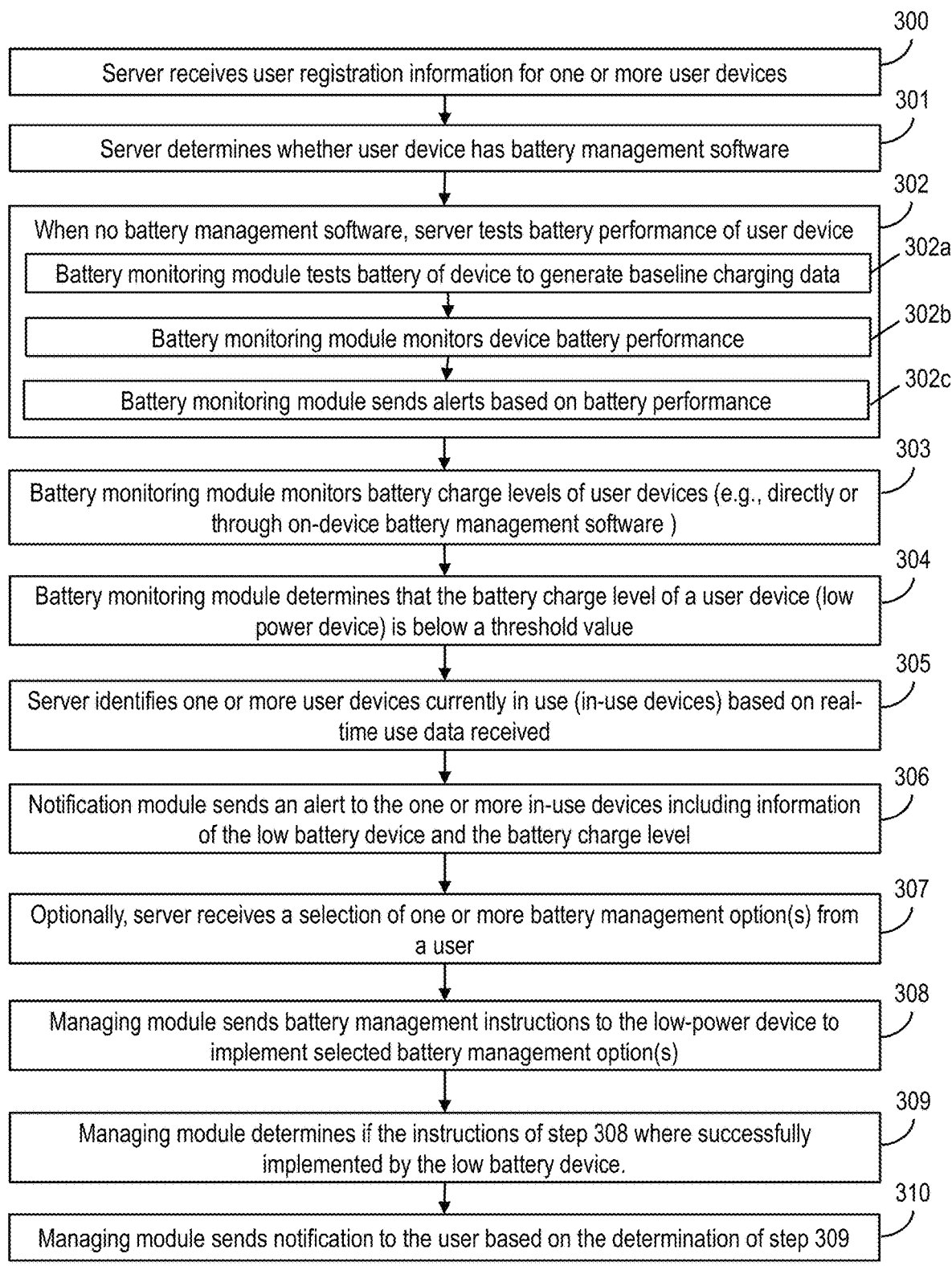
FIG. 3 shows a flowchart of steps of a method in accordance with aspects of the invention.

FIG. 3 shows a flowchart of a method in accordance with aspects of the invention. Steps of the method of FIG. 3 may be performed in the environment illustrated in FIG. 2, and are described with reference to elements shown in FIG. 2.

At step 300, the power management server 60 receives user registration information for one or more user devices (e.g., user devices 62-66 of FIG. 2). The user registration information may be submitted by a user and/or may be obtained from other sources. In one example, a user provides information regarding the identification (e.g., make/model, identification number, etc.) of their user devices to the power management server 60 and the power management server 60 obtains additional information regarding the user devices from a remote third party through the network 55 (e.g., information regarding the make/model, including whether the make/model includes associated battery management software). In implementations, the power management server 60 saves the user registration information locally (e.g., the user database 81) or remotely (now shown). In aspects, each user registering with the power management server 60 a plurality of user devices (e.g., user devices 62-66 of FIG. 2). In embodiments, the power management server 60 saves a profile for each user device in the user database 81.

At step 301, the power management server 60 determines whether user devices registered at step 300 include associated battery management software. In aspects, the server 60 obtains information regarding the presence or absence of battery management software from the user (e.g., through a dropdown menu during registration). Alternatively, in aspects, the power management server 60 obtains information regarding the battery management software of a user device through a third party source (e.g., application programming interface (API)), or through the use of a look-up table listing attributes of user devices (e.g., attributes of user devices by make/model including the presence/absence of battery management software).

Optionally, at step 302, when the power management server 60 determines that a user device does not include battery management software of its own at step 301, the power management server 60 initiates a battery performance test. In aspects, the battery performance test includes the following substeps.

At substep 302*a*, the power management server 60 monitors a battery of a user device (e.g., battery 71 of in-use device 62) to generate baseline battery charging data. In aspects, the baseline battery charging data provides information regarding the time it takes for the battery 71 to charge or discharge. In one example, the power management server 60 determines that a baseline full charge of the battery 71 lasts between 90 and 100 minutes based on average usage. A variety of existing battery testing methods may be utilized in the implementation of substep 302*a*. In aspects, the battery monitoring module 82 of the power management server 60 implements substep 302*a*.

At substep 302*b*, the power management server 60 monitors battery charging data of the battery (e.g., battery 71) over time. In embodiments, the power management server 60 monitors the battery performance of the battery (e.g., battery 71) for deviations in performance over time. In aspects, the battery monitoring module 82 of the power management server 60 implements substep 302*b*. In embodiments, the power management server 60 accesses historic battery charging data and compares real-time battery charging data to the historic battery charging data to determine a change in battery performance over time. Existing battery performance monitoring techniques may be utilized in the implementation of subset 302*b*.

At substep 302*c*, the power management server 60 sends an alert based on the monitoring of substep 302*b*. In aspects, the power management server 60 sends an alert to one or more in-use devices 62 of the user indicating a degradation in the performance of the battery (e.g., battery 71) when the power management server 60 determines the battery performance has degraded below a predetermined threshold value based on the monitoring of substep 302*b*. The term in-use device as used herein refers to a user device that is currently being utilized by a user, either directly (e.g., data is input/accessed) or indirectly (e.g., device is worn or carried by the user). Further details regarding the identification of in-use devices are set forth below with respect to step 305 of FIG. 3. In one example, if a charge of the battery 71 decreases more than 10% on more than 2 instances, then the power management server 60 triggers an alert regarding the identified level of degradation of the battery 71. In one example, the alert is in the form of a text-based message indicating that the battery 71 is failing. In aspects, the battery monitoring module 82 of the power management server 60 implements substep 302*c*.

At step 303, the power management server 60 monitors battery charge levels of registered user devices via the network 55. In embodiments, the battery monitoring module 82 implements step 303. In implementations, the power management server 60 monitors battery charge levels by obtaining battery charge data directly from a user device (e.g., in-use device 62), or obtains battery charge data from existing battery management software of the user device (e.g., battery management software of the power module 72 of in-use device 62). In aspects, the power management server 60 utilizes existing battery monitoring techniques in the implementation of step 303. In embodiments, the battery monitoring module 82 of the power management server 60 implements steps 304.

At step 304, the power management server 60 determines that the battery charge level of a registered user device (e.g., in-use device 62) is below a predetermined threshold value, and the user device is a low-power device. In one example, if the battery charge level of the headphones 64 is at 10% of its full charge, the power management server 60 determines that headphones 64 are a low-power device. In aspects, the predetermined threshold value is set by administrators, obtained by third parties, or obtained from user input (e.g., user registration information). In embodiments, the battery monitoring module 82 implements steps 304.

At step 305, the power management server 60 identifies one or more registered user devices that are currently in use by a registered user as in-use devices (e.g., in-use devices 62). As noted previously, the term in-use device as used herein refers to a user device that is currently being utilized by a user, either directly (e.g., data is input/accessed) or indirectly (e.g., device is worn or carried by the user). In one example, a user is determined to be using a registered user device when the device is being carried by the person (e.g., a wearable device or smartphone), or when the user is directly utilizing the device such as through interacting with a GUI of the device (e.g., GUI 70 of in-use device 62). In embodiments, only registered user devices enabled to communicate notifications or alerts to a user are considered by the power management server 60 as in-use devices. In one example, the power management server 60 utilizes user device profiles in the user database 81 to determine which user devices contain GUIs (e.g., GUI 70 of in-use device 62), and designates only those user devices with GUIs as being in-use devices in accordance with step 305.

In implementations, the power management server 60 determines if a registered user device is currently in use utilizing a number of methods. In implementations, the power management server 60 determines which registered user devices are currently in use by: pinging the user device, obtaining device metadata such as last usage timestamp data, determining if the device is locked or unlocked, and/or using device sensors (e.g., accelerometers) to detect movement of the devices. In embodiments, if multiple registered user devices are in use at the same time, the power management server 60 identifies all or a subset of the user devices as in-use devices. In aspects, the power management server 60 identifies in-use device's based on prioritization of the user devices, such as through the use of prioritization information in the user database 81 indicating an order of priority for the user's various devices.

At step 306, the power management server 60 sends a notification or alert to one or more in-use devices identified at step 305, including information regarding the low-power device and information regarding the battery status. In one example, the power management server 60 determines at step 304 that the battery charge level of the headphones 64 of FIG. 2 has fallen below a predetermined threshold value, and then send an alert to the in-use device 62 indicating that the battery of headphones 64 is low on power in accordance with step 306. In another example, the power management server 60 determines that a first in-use device has a low battery level at step 304, and then send an alert to the first in-use device and a second in-use device in accordance with step 306, indicating that the first in-use device is low on power.

Optionally, at step 306, the power management server 60 sends one or more battery management options to one or more in-use devices with the notification or alert. In implementations, the power management server 60 sends user-selectable battery management options including options to: shut down the low-power device; disable some features of the low-power device to save power, initiate device-specific (e.g., proprietary) battery saving functions of the low-power device, hibernate the low-power device, initiate a sleep mode of the low-power device, or the like. In embodiments, the notification module 83 of the power management server implements step 306.

If step 306 is initiated, at step 307 the power management server 60 receives a selection of one or more battery management options from a user (e.g., via GUI 70 of in-use device 62). In one example, a user of in-use device 62 selects to power off headphones 64 based on an alert indicated that the headphones 64 are low on power. In embodiments, the notification module 83 of the power management server 60 receives the selection from a user in accordance with step 307.

At step 308, the power management server 60 sends battery management instructions to the low-power device identified at step 304 based on the received selection of one or more battery management options at step 307. In one example, the power management server 60 sends instructions to the headphones 64 to power off based on the receipt of a battery management option from the in-use device 62 to power off the headphones 64. In embodiments, the battery monitoring module 82 is in communication with the notification module 83 and implements step 308 based on the receipt of the battery management option selection by the notification module 83.

At step 309, the power management server 60 determines if the instructions of step 308 have been successfully implemented by the low-power device. In embodiments, the power management server 60 determines if the instructions have been successfully implemented based on a notification received from the low-power device indicating that the instructions were or were not successfully implemented. In one example, in response to receiving instructions from the power management server 60 to go into a sleep mode, the headphones 64 send a notice to the power management server 60 that the headphones 64 have been successfully transitioned to a sleep mode.

At step 310, the power management server 60 sends a notification to the user based on the determination of step 309. In embodiments, the power management server 60 sends a notification to the one or more in-use devices identified at step 305. In one example, the power management server 60 sends a notification to a user via one or more in-use devices 62 that the headphones 64 were successfully transitioned to a sleep mode. In an alternative example, the power management server 60 sends a notification to a user via one or more in-use device 62 that the headphones 64 were not successfully transitioned to a sleep mode. In aspects, the notification module 83 implements step 310.

Figure 4:
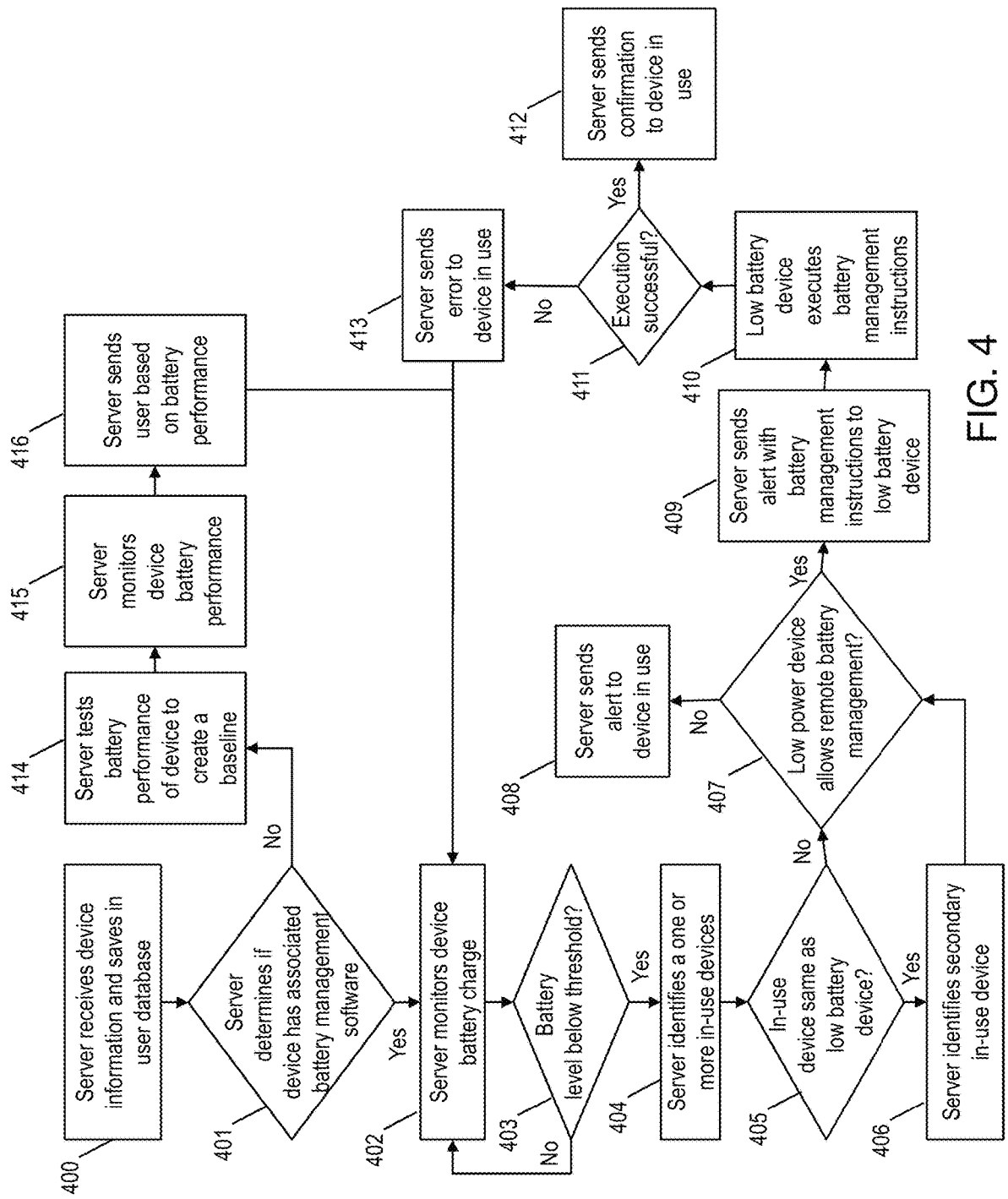
FIG. 4 shows a flow diagram illustrating steps of the method of FIG. 3 in accordance with aspects of the invention.

FIG. 4 shows a flow diagram illustrating steps of the method of FIG. 3 in accordance with aspects of the invention, and is described with reference to elements shown in FIG. 2. For ease of reference, the power management server 60 is referred to as simply the "server" in FIG. 4.

With reference to FIG. 4, at step 400 the power management server 60 receives device information and saves it in a user database (e.g., user database 81), in accordance with step 300 of FIG. 3. At step 401, the power management server 60 determines if one or more registered user devices have associated battery management software loaded therein in accordance with step 301 of FIG. 3. If the power management server 60 determines that a user device (e.g., in-use device 62) does include battery management software, then at step 402, the power management server 60 monitors the user device for battery charge levels in accordance with step 303 of FIG. 3. If the power management server 60 determines that the user device is a lower battery device due to the battery level being below a predetermined threshold value at step 403 (in accordance with step 304 of FIG. 3), then at step 404 the power management server 60 identifies one or more in-use devices, in accordance with step 305 of FIG. 3. Conversely, if the power management server 60 determines that the battery level is not below a predetermined threshold value at step 403, then the power management server 60 will continue monitoring the battery charge of the user device in accordance with step 402. In aspects, the monitoring of step 402 is performed on a continuous or periodic basis.

Still referencing FIG. 4, in embodiments, if the power management server 60 identifies that the low battery device is the same as the in-use device at step 405, then the power management server 60 identifies at least one additional in-use device (secondary in-use device) at step 406. At step 407, if the in-use device is not the same as the low battery device, then the power management server 60 determines if the low battery device allows for remote battery management of the low battery device. Similarly, if a secondary in-use device is identified at step 406, then the power management server 60 determines at step 407 if the low battery in-use device allows for remote battery management of the low battery in-use device. In aspects, step 407 conducted in accordance with step 301 of FIG. 3 (i.e., determining whether the in-use or secondary in-use device has battery management software). In aspects, the power management server 60 accesses user device data on the user database 81 to determine if the registered in-use device or secondary in-use device includes dedicated remote battery management functionality.

At step 408, if the power management server 60 determines that the in-use device or the secondary in-use device does not include remote battery management functions, then the power management server 60 sends an alert to the in-use device and/or secondary in-use device to alert the user regarding the low battery device. In embodiments, the power management server 60 sends an alert to the secondary in-use device alerting the user that the in-use device has a low battery. In embodiments, the power management server 60 sends an alert to all in-use devices determined at step 404, or to a predetermined select subgroup of the in-use devices. In aspects, step 408 of FIG. 4 is performed in accordance with step 306 of FIG. 3.

At step 409, if the power management server 60 determines that the in-use device or the secondary in-use device does include remote battery management functions, the power management server 60 sends an alert with battery management instructions to the low battery device identified at step 403, in accordance with step 308 of FIG. 3. At step 410, the low battery device executes the battery management instructions, such as powering off the low battery device. In aspects, the low battery device sends an alert back to the power management server 60 indicating that the instructions were or were not implemented. At step 411 the power management server 60 determines if the instructions sent at step 409 were executed successfully, in accordance with step 309 of FIG. 3. If the instructions were successfully executed, then at step 412 the power management server 60 sends confirmation to the in-use device and/or the secondary in-use device to inform the user that the instructions were successfully executed. Alternatively, if the power management server 60 determines that the instructions were not successfully executed at step 411, then at step 413, the power management server 60 sends an error alert to the in-use device and/or secondary in-use device.

If the power management server 60 determines that a user device (e.g., in-use device 62) does not include associated battery management software for the device at step 401, then at step 414, the power management server 60 tests battery performance in accordance with step 302 of FIG. 3. At step 415, the power management server 60 monitors the user device and gathers battery performance data and sends an alert to the user based on the battery performance data at step 416. In implementations, steps 414-416 are implemented in accordance with steps 302a-302c of FIG. 3. In embodiments, the power management server 60 sends an alert at step 416 to one or more identified in-use devices of the user (e.g., in-use device 62) based on battery performance data gathered at step 415.

Figure 5:
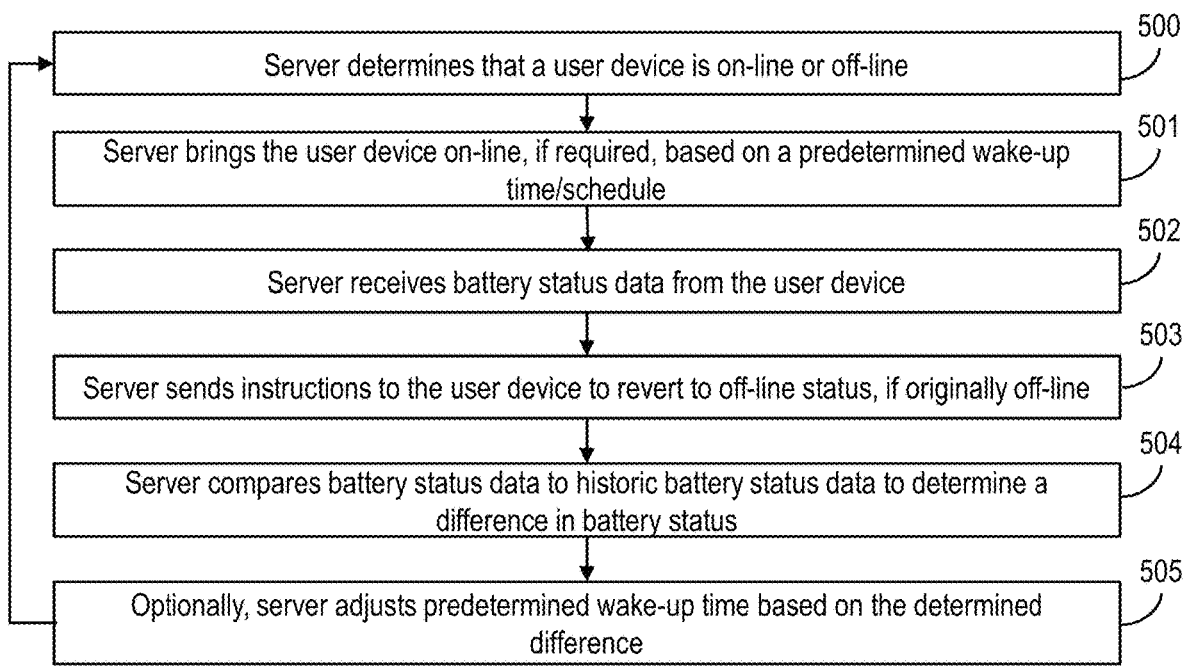
FIG. 5 shows a flowchart of a cognitive battery management method in accordance with aspects of the invention.

FIG. 5 shows a flowchart of a cognitive battery management method in accordance with aspects of the invention. Steps of the method of FIG. 5 may be performed in the environment illustrated in FIG. 2, and are described with reference to elements shown in FIG. 2.

At step 500, the power management server 60 determines that a user device (e.g., off-line device 63 of FIG. 2) is in an off-line or on-line mode. In embodiments, step 500 is implemented concurrent with one or more steps of FIG. 3. For example, step 500 may be implemented prior to step 303 of FIG. 3. The term off-line mode as used herein refers to a reduced function mode of a registered user device (e.g., off-line device 63) that results in a situation wherein battery management software of the user device or battery system components (e.g., microprocessor) of the registered user device are not accessible by the power management server 60 (e.g., via the network 55) for monitoring. In other words, when a device is off-line, the power management server 60 is unable to obtain battery status data of the off-line user device. Examples include when a device is powered off, in a sleep mode, in a hibernation mode, or the like. Conversely, the term on-line mode as used herein refers to an active mode wherein battery management software of a registered user device or battery system components of the registered user device are accessible by the power management server 60 (e.g., via the network 55) for monitoring. In embodiments, step 500 is implemented by the battery monitoring module 82 of the power management server 60.

At step 501, the power management server 60 causes an off-line device (e.g., off-line device 63) to change from an off-line mode detected at step 500 to an on-line mode, based on a predetermined wake-up schedule. In embodiments, predetermined wake-up schedules are saved in individual user device profiles on the user database 81, wherein the wake-up schedules define a time period between scheduled wake-up sessions. The term wake-up session refers to a time for initiating a change from an off-line status to an on-line status to "wake" an off-line user device (e.g., off-line device 63). In one example, the power management server 60 determines at step 500 that a smartwatch 65 if off-line (in a sleep mode) and, based on a predefined schedule indicated that the battery status of the smartwatch 65 should be checked every 5 hours, sends instructions to the smartwatch 65 to initiate a wake-up session, wherein the instructions cause the smartwatch 65 to change from the off-line mode to an on-line mode. In embodiments, step 501 is implemented by the battery monitoring module 83 of the power management server 60.

At step 502, the power management server 60 receives battery status data from the on-line user device. In aspects, battery status data includes battery performance data and battery charge level data. In embodiments, step 502 is implemented as part of steps 302 and/or 304 of FIG. 3. A variety of existing battery monitoring methods may be utilized in the implementation of step 502. In aspects, the power management server 60 receives battery status data from dedicated battery management software on a user device (e.g., off-line device 63), via the network 55. In embodiments, the power management server 60 receives battery status data directly from battery system components (e.g., microprocessor) of a user device, via the network 55. In aspects, battery status data is saved in a database of the power management server 60, or a remote database.

At step 503, the power management server 60 sends instructions to the on-line user device to cause the device to revert back to its previous off-line mode. In aspects, the battery monitoring module 82 of the power management server 60 implements step 503. In one example, the power management server 60 sends instructions to the smartwatch 65 to revert from a current on-line mode to the previous off-line mode, which was a sleep mode.

At step 504, the power management server 60 compares battery status data received at step 502 to historic battery status data to determine a difference in battery status. In embodiments, the battery monitoring module 82 of the power management server 60 implements step 504. In aspects for step 504, the power management server 60 accesses historic battery status data save on the power management server 60 to compare a current battery status received at step 502 with the battery status data from a previous iteration of steps 500-505.

Optionally, at step 505, the power management server 60 adjusts the predetermined wake-up time utilized at step 501 based on the difference in battery status determined at step 504. In embodiments, the delta in battery status determined at step 504 is compared to threshold values to determine if the wake-up time should be adjusted. In a first example, if a delta between battery status for the smartwatch 65 is less than 10% (when the device always off), then the power management server 60 increases the wake-up time (i.e., period between wake-up sessions) for the smartwatch 65 by 20%. In another example, the power management server 60 determines that a battery of a controller 66 loses a charge at a rate of 5% per day when off-line, and determines that there is no need to obtain battery status data from the controller 66 on a daily basis because doing so would drain more power from the battery. Accordingly, the power management server 60 in this example checks the battery status data of the controller 66 every 2 or 3 days, resulting in an accumulation of battery status data over time without a significant impact on the battery life of the controller 66. In other scenarios, if a user device loses power very quickly when off-line, waiting 24 hours to obtain battery status data may be too late. In such cases the power management server 60 progressively reduces the wake-up time in a device schedule to adjust to the battery level of the device.

Steps 500-505 may be repeated, resulting in incremental adjustment of the predetermined wake-up time for individual user devices over time. Advantageously, as the batteries of user devices age and performance degrades over time, the method of FIG. 5 enables cognitive adjustment to the battery management methods utilized by the power management server 60. In other words, since the process of FIG. 5 is iterative, the power management server 60 will adjust the wake-up time of a user device progressively with the battery. In fact, batteries eventually decrease their autonomy and the embodiments of the invention are designed to automatically adjust to the current battery autonomy. This ensures that each device profile remains unique, with different wake-up schedules for each device base on respective battery life and performance.

Figure 6:
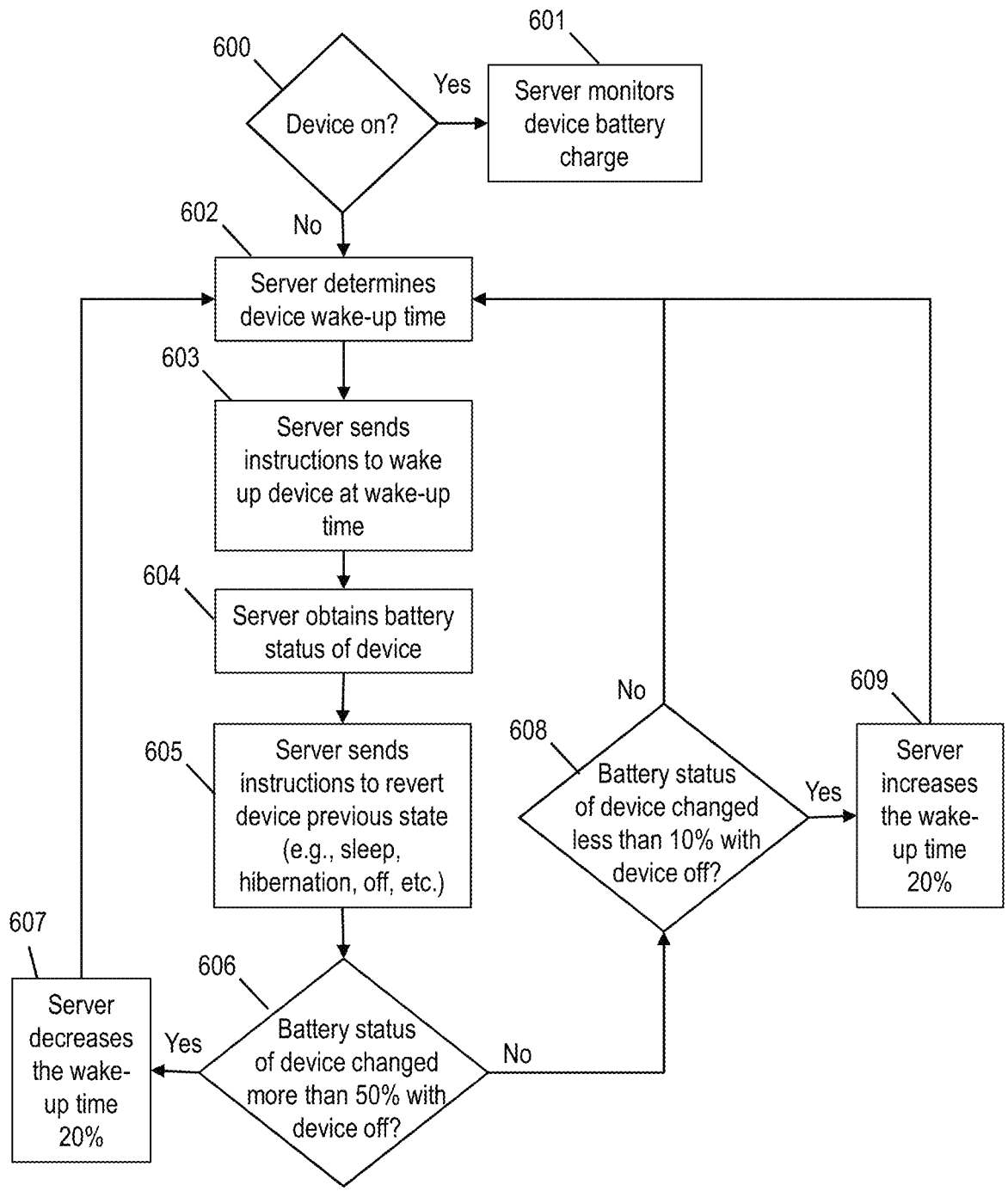
FIG. 6 shows a flow diagram illustrating exemplary cognitive battery management steps in accordance with aspects of the invention.

FIG. 6 shows a flow diagram illustrating exemplary cognitive battery management steps in accordance with aspects of the invention. Steps of FIG. 6 may be performed in accordance with FIG. 5, and are described with reference to elements shown in FIG. 2.

At step 600, the power management server 60 determines if a registered user device is in an on-line state or an off-line state, in accordance with step 500 of FIG. 5. If the power management server 60 determines that the user device at issue is on-line, then at step 601, the power management server 60 simply monitors the device battery levels in accordance with step 303 of FIG. 3. However, if the power management server 60 determines that the user device at issue is off-line, then at step 602 the power management server 60 determines a wake-up time associated with the user device. In aspects, the wake-up time is saved in the user device profile in the user database 81 or a remote database (not shown). In one example, the wake-up time for a device is based on a schedule of wake-up events every 24 hours. At step 603, the power management sever 60 sends instructions to the user device (e.g., off-line device 63) at the scheduled wake-up time to switch the user device from the off-line state to an on-line state, in accordance with step 501 of FIG. 5. At step 604, the power management server 60 obtains battery status data from the user device (e.g., battery charge data, battery performance data, etc.) in accordance with step 502 of FIG. 5 and/or step 303 of FIG. 3. At step 605, the power management server 60 sends instructions to the user device at issue to revert the device to the previous off-line state, in accordance with step 503 of FIG. 5. In one example, the power management server 60 sends instructions to the user device to revert back to a hibernation state.

With continued reference to FIG. 6, at step 606, the power management server 60 determines if the battery status of the device (e.g., battery charge level) has changed more than 50% while the user device was off-line. If the power management server 60 determines that the battery status of the device changed more than 50% while the device was off-line, then at step 607 the power management server 60 decreases the wake-up time by 20% in accordance with step 505 of FIG. 5. Conversely, if that battery status of the device has not changed more than 50% while the device was off-line, then the power management server 60 determines if the battery status has changed less than 10% while the device was off at step 608. If the power management server 60 determines that the battery status of the device has changed less than 10% with the device off, then the power management server 60 increases the wake-up time by 20% in accordance with step 505 of FIG. 5. Accordingly, the next time the power management server 60 determines the device wake-up time at step 602, it will be increased by 20%. Conversely, if the power management server 60 determines that the battery status has changed more than 10%, but less than 50%, then wake-up time for the device will remain unchanged, and the cycle of FIG. 6 will repeat. Thus, it should be understood that embodiments of the invention incrementally adjust wake-up times for battery monitoring of a device as a battery of the device degrades over time.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/ or the service provider can receive payment from the sale of advertising content to one or more third parties.

In still another embodiment, the invention provides a method for centralized power management of wireless user devices. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
monitoring, by a computing device, battery charge levels for remote user devices;
identifying, by the computing device, that a battery charge level of a first user device of the remote user devices is below a predetermined threshold value based on the monitoring;
determining, by the computing device, that one or more of the remote user devices does not include battery management software, wherein the monitoring of the battery charge levels for the one or more of the remote user devices is performed directly by the computing device;
identifying, by the computing device, at least one in-use device from the remote user devices based on real-time data indicating that the at least one in-use device is in use by a user; and
sending, by the computing device, an alert to the at least one in-use device based on the identifying the at least one in-use device, wherein the alert includes information about the first user device and information regarding the battery charge level of the first user device.

2. The method of claim 1, further comprising:
generating, by the computing device, battery charging data for each of the one or more remote user devices by testing batteries of each of the one or more remote user devices;
monitoring, by the computing device, changes in the battery charging data over time; and
sending, by the computing device, a notification regarding battery performance to the at least one in-use device based on the monitoring.

3. The method of claim 1, further comprising:
sending, by the computing device, user selectable battery management options to the at least one in-use device;
receiving, by the computing device, a selection of one of the user selectable battery management options; and
sending, by the computing device, instructions to the first user device to implement a battery management function based on the selection.

4. The method of claim 3, further comprising receiving, by the computing device, an indication from the first user device regarding whether the instructions were successfully implemented.

5. The method of claim 4, further comprising sending, by the computing device, a notification to the at least one in-use device based on the indication from the first user device.

6. The method of claim 5, wherein the notification comprises an error notification indicating that the instructions were not successfully implemented.

7. The method of claim 1, wherein identifying the at least one in-use device from the remote user devices further comprises determining that the at least one in-use device is configured to present notifications to a user.

8. The method of claim 1, further comprising receiving, by the computing device, registration information for the remote user devices, including identification information for the remote user devices.

9. A computer program product comprising a computer readable storage medium having program instructions embodied therewith, the program instructions executable by a computing device to cause the computing device to:
monitor battery charge levels for remote user devices;
identify that a first user device of the remote user devices is a low battery device when a battery charge level of the first user device is below a predetermined threshold value based on the monitoring;
identify at least one in-use device from the remote user devices based on real-time data indicating that the at least one in-use device is in use by a user;
send an alert to the at least one in-use device including information about the battery charge level of the low battery device; and
send user selectable battery management options for the low battery device to the at least one in-use device.

10. The computer program product of claim 9, wherein the program instructions further cause the computing device to determine whether each of the remote user devices includes battery management software.

11. The computer program product of claim 10, wherein the determining whether each of the remote user devices includes the battery management software comprises determining that one or more of the remote user devices does not include the battery management software, and wherein the program instructions further cause the computing device to:
generate baseline battery charging data for each of the one or more remote user devices by testing batteries of each of the one or more remote user devices;
monitor changes in the baseline battery charging data over time; and
send a notification to the at least one in-use device based on the monitoring.

12. The computer program product of claim 9, wherein the program instructions further cause the computing device to:
receive a selection of one of the user selectable battery management options; and
send instructions to the low battery device to implement a battery management function based on the selection.

13. The computer program product of claim 12, wherein the program instructions further cause the computing device to receive an indication from the low battery device regarding whether the instructions were successfully implemented.

14. The computer program product of claim 13, wherein the program instructions further cause the computing device to send a notification to the at least one in-use device based on the indication from the low battery device.

15. The computer program product of claim 14, wherein the notification comprises an error notification indicating that the instructions were not successfully implemented by the low battery device.

16. A system comprising:
a processor, a computer readable memory and a computer readable storage medium associated with a computing device;
program instructions to monitor battery charge levels for remote user devices;
program instruction to identify one or more of the remote user devices that do not include battery management software, wherein the monitoring battery charge levels of the one or more of the remote user devices is performed directly by the computing device;
program instructions to identify that a battery charge level of a first user device of the remote user devices is below a predetermined threshold value based on the monitoring;
program instructions to identify at least one in-use device from the remote user devices based on real-time data indicating that the at least one in-use device is in use by a user; and
program instructions to send an alert to the at least one in-use device based on the identifying the at least one in-use device, wherein the alert includes information about the first user device and information regarding the battery charge level of the first user device,
wherein the program instructions are stored on the computer readable storage medium for execution by the processor via the computer readable memory.

17. The system of claim 16, further comprising:
program instructions to generate battery charging data for each of the one or more remote user devices by testing batteries of each of the one or more remote user devices;
program instructions to monitor changes in the battery charging data over time; and
program instructions to send an alert regarding battery performance to the at least one in-use device based on the monitoring.

18. The system of claim 16, further comprising:
program instructions to send user selectable battery management options to the at least one in-use device;
program instructions to receive a selection of one of the user selectable battery management options; and
program instructions to send instructions to the first user device to implement a battery management function based on the selection.

19. The system of claim 18, further comprising:
program instructions to receive an indication from the first user device regarding whether the instructions were successfully implemented; and
program instructions to send a notification to the at least one in-use device based on the indication from the first user device.

20. The system of claim 16, further comprising program instructions to receive and store registration information for the remote user devices, including identification information for the remote user devices.

21. A method comprising:
monitoring, by a computing device, battery charge levels for remote user devices;
identifying, by the computing device, that a battery charge level of a first user device of the remote user devices is below a predetermined threshold value based on the monitoring;
identifying, by the computing device, at least one in-use device from the remote user devices based on real-time data indicating that the at least one in-use device is in use by a user;
sending, by the computing device, an alert to the at least one in-use device based on the identifying the at least one in-use device, wherein the alert includes information about the first user device and information regarding the battery charge level of the first user device;
sending, by the computing device, user selectable battery management options to the at least one in-use device;
receiving, by the computing device, a selection of one of the user selectable battery management options; and
sending, by the computing device, instructions to the first user device to implement a battery management function based on the selection.

22. A system comprising:
a processor, a computer readable memory and a computer readable storage medium associated with a computing device;
program instructions to monitor battery charge levels for remote user devices;
program instructions to identify that a battery charge level of a first user device of the remote user devices is below a predetermined threshold value based on the monitoring;
program instructions to identify at least one in-use device from the remote user devices based on real-time data indicating that the at least one in-use device is in use by a user;
program instructions to send an alert to the at least one in-use device based on the identifying the at least one in-use device, wherein the alert includes information about the first user device and information regarding the battery charge level of the first user device,
program instructions to send user selectable battery management options to the at least one in-use device;
program instructions to receive a selection of one of the user selectable battery management options; and
program instructions to send instructions to the first user device to implement a battery management function based on the selection;
wherein the program instructions are stored on the computer readable storage medium for execution by the processor via the computer readable memory.

\* \* \* \* \*